United States Patent [19]

Ichiyanagi et al.

[11] 3,896,315

[45] July 22, 1975

[54] REMOTE CONTROL UNIT WITH DISPLAY DEVICE

[75] Inventors: Toshikazu Ichiyanagi, Tokyo; Mitsutoshi Ogiso, Kawasaki, both of Japan

[73] Assignee: Canon Kabushiki Kaisha, Japan

[22] Filed: Aug. 10, 1973

[21] Appl. No.: 387,312

[30] Foreign Application Priority Data

Aug. 16, 1972 Japan .............................. 47-82003

[52] U.S. Cl. ................................ 307/112; 352/170
[51] Int. Cl. ......................................... H01h 47/00
[58] Field of Search ........... 307/112, 113; 340/332, 340/331, 248 D, 253 Q, 248 R, 248 B, 248; 352/170; 367/112

[56] References Cited

UNITED STATES PATENTS

| | | | |
|---|---|---|---|
| 3,006,239 | 10/1961 | Smolar | 340/248 R |
| 3,424,071 | 1/1969 | Schwahn | 354/141 X |
| 3,583,800 | 6/1971 | Sakai | 352/170 |
| 3,784,292 | 1/1974 | Winkler et al. | 352/170 |

*Primary Examiner*—G. Z. Rubinson
*Assistant Examiner*—M. Ginsburg
*Attorney, Agent, or Firm*—Toren, McGeady and Stanger

[57] ABSTRACT

The present invention refers to a remote control unit with display device for small electrical appliances such as little cine-cameras, tape recorders and so on. In the remote switching members or the output circuit of the timer circuit in a remote control unit an illuminating diode is inserted. The illuminating diode is lit up or is put out, when the electric appliance is brought into a conductive state by the remote switching members or the timer circuit, to display the state of the electric appliance.

8 Claims, 8 Drawing Figures

REMOTE CONTROL UNIT WITH DISPLAY DEVICE

BACKGROUND OF THE INVENTION

1. Field of the Invention

The present invention refers to a remote control unit with display device for small electrical appliances such as little cine-camera, tape-recorders and so on.

2. Description of the Prior Art

With reference to small electrical appliances such as small cine-cameras, tape-recorders and so on in which an electrical motor is built as a driving source, an outer remote control unit is usually mounted on the casing of the electrical appliances in such a manner that the control of the driving for the small electrical appliance can be carried out from outside. In case the driving of the small electrical appliance is switched off by means of the outer remote control unit, a stabilized operation, however, can not be expected, because the small electrical appliance and the remote control unit are distant from each other so that it is difficult to confirm whether the small electrical appliance is operated without fail.

When further the electrical source such as batteries put in the little electrical appliance is consumed in such a manner that the nominal electrical voltage is not supplied, the driving motor does not rotate at a standard speed, whereby also it is impossible to check whether the small electrical appliance operates normally.

SUMMARY OF THE PRESENT INVENTION

The purpose of the present invention is to offer a remote control unit which does not have the above mentioned weak point of the conventional remote control unit, capable of displaying the operation of the appliance and whose disposition of the circuit is very simplified.

The further purpose of the present invention is to offer a remote control unit, whereby in the remote switch circuit to be connected with the outer remote terminal of the appliance an illuminating diode is inserted in such a manner that the operation of the appliance can be checked by means of the illumination phenomenon of the diode.

Further purpose of the present invention will be explained in detail according to the drawings of the embodiments of the present invention.

DESCRIPTION OF THE PREFERRED EMBODIMENTS

Figure 1:
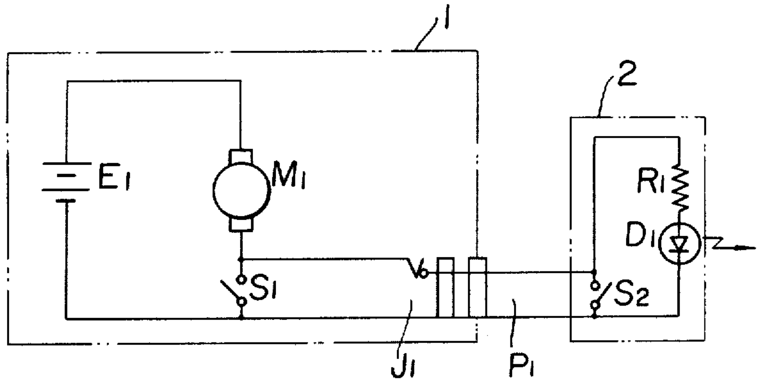
FIG. 1 shows a circuit diagram of the remote control unit according to the present invention.

In FIG. 1 the unit according to the present invention is shown in the state connected with the outer remote control terminal for releasing the cine-camera. In the drawing, 1 is the cine-camera body, while 2 is the remote control unit. In the cine-camera body 1, a driving circuit is mounted, consisting of a driving motor $M_1$ for feeding film and rotating shutter blades, a driving battery $E_1$, a release switch $S_1$ and an outer remote control terminal $J_1$, whereby when the switch $S_1$ is closed in functional connection with the shutter release button mounted in the cine-camera body 1 not shown in the drawing, the motor $M_1$ starts to rotate in such a manner that by means of a conventional mechanism the mechanism for film feeding and that for shutter are driven. In the remote control unit 2 there is a series circuit consisting of a remote control switch $S_2$, a current limiting resistance $R_1$ and an illumination diode $D_1$, whereby the remote control switch $S_2$ is connected with a plug $P_1$ of the connection cable. When in the connection jack $J_1$ of the body the plug $P_1$ of the remote control unit 2 is inserted in the above mentioned arrangement, the illumination diode $D_1$ is supplied with a current by means of the resistance $R_1$ in case the battery $E_1$ supplies an electrical pressure above the nominal value, whereby the diode $D_1$ illuminates in case there is no damage in the winding of the motor or the like and the electrical pressure of the battery is normal. When the remote control switch $S_2$ is then closed, the motor $M_1$ starts to rotate, being supplied with a current by means of $E_1$ — $M_1$ — $S_2$ — $E_1$. At the same time the diode stops iluminating, because the diode is not supplied with the current any more. By means of this stop of illumination of the diode, it is displayed that the cine-camera body 1 be in correct function.

It is possible to choose the value of the resistance $R_1$ large enough, because the electrical power needed for the illumination diode is as small as several mW, while the consumption of the battery $E_1$ connected with the illumination of the diode is very small when the switch $S_2$ is switched off, so that even a battery with small capacity will do because the electrical consumption is very small.

Figure 2:
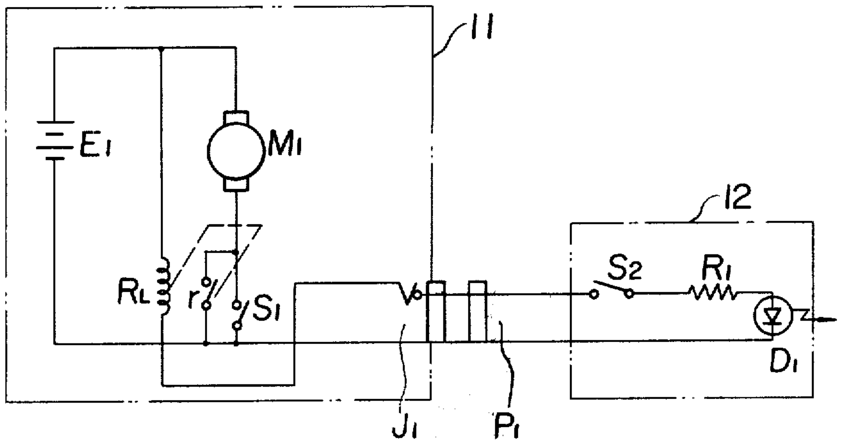
FIG. 2 shows a variation of the circuit of the remote control unit according to the present invention.

FIG. 2 shows another variation of the remote control unit according to the present invention, whereby parallel to the release switch $S_1$ the contact r of the relay $R_L$ is connected. Further the resistance $R_1$ and the illumination diode $D_1$ are connected in series with each other and to the plug $P_1$ of the remote control unit 12. When in the above mentioned arrangement the remote control switch $S_2$ in the remote control unit 12 is closed, the relay $R_L$ is brought into function so as to close the contact r in such a manner that the motor $M_1$ starts to be driven, while the driving current of the relay $R_L$ is given to the diode $D_1$ by means of the switch $S_2$ and the resistance $R_1$ in such a manner that the diode $D_1$ illuminates. Consequently the diode $D_1$ illuminates only when the remote control switch $S_2$ is closed, whereby with the illumination the relay $R_L$ works with security so as to close the contact r, while it is possible to confirm that there is no winding damage and the electrical pressure of the battery $E_1$ is normal.

Further in case the remote control switch $S_2$ remains opened, namely the remote control unit is out of service, the diode $D_1$ does not illuminates so that the unnecessary consumption of electrical power can be avoided.

Figure 3:
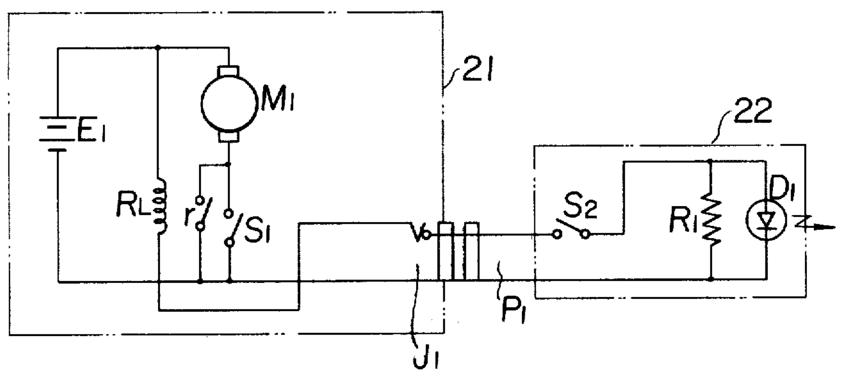
FIG. 3 shows a further variation of the circuit of the remote control unit according to the present invention.

In FIG. 3 further embodiment is shown, in which the resistance $R_1$, different from FIG. 2, is connected parallel to the illumination diode $D_1$.

Figure 4:
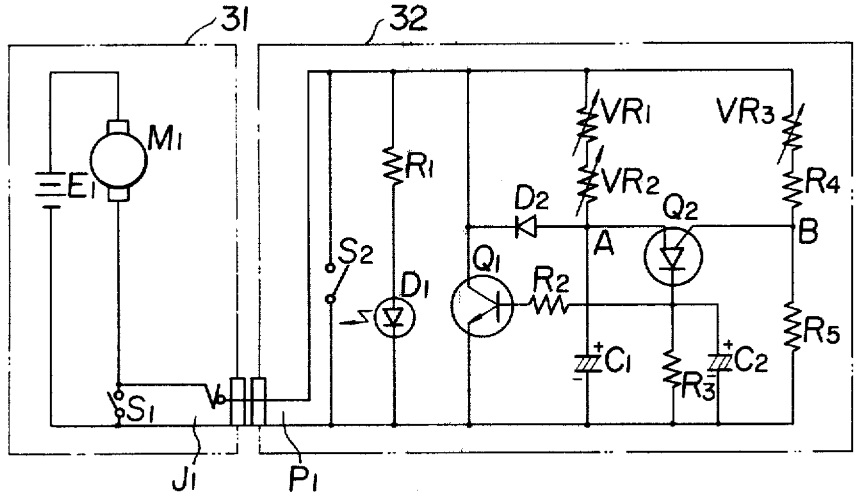
FIGS. 4 – 7 show further variation of the circuit of the remote control unit according to the present invention.

FIG. 4 shows a further embodiment, in which in the remote control unit 32 a timer circuit is built-in, whereby in the remote control unit 32 a potentiometer $VR_3$, resistances $R_4$ and $R_5$ are connected parallel to the resistance $R_1$ and the illumination diode $D_1$ and to the voltage dividing point B a unijunction transistor (UJT) is connected. The variable resistances $VR_1$ and $VR_2$ are inserted in the circuit to charge or discharge the condenser $C_1$. $C_2$ and $R_3$ are respectively a time setting condenser and a time setting resistance, $Q_1$ a contactless switching transistor connected parallel to the remote control switch $S_1$ and $D_2$ a diode to prevent the reversed current.

When in the above mentioned arrangement the remote control plug $P_1$ is inserted in the cine-camera body 31, the condenser $C_1$ is charged by means of a charging circuit consisting of a battery $E_1$, a motor $M_1$, resistances $VR_1$, $VR_2$, a condenser $C_1$ and a battery.

If the resistances $VR_1$ and $VR_2$ are adjusted in such a manner that their impedance lies higher than that of the motor, the motor does not start to rotate even if a charging current runs through the motor, while after the elapse of a time determined by $(VR_1, VR_2) \times C_1$ the potential at A rises higher than that at B in such a manner that the UJT is brought into a conductive state whereby a voltage drop takes place between both terminals of the resistance $R_3$. The produced electrical voltage is led to the condenser $C_2$ until the condenser $C_2$ has a certain determined terminal voltage, when the voltage is given to the base of the transistor $Q_1$ through the resistance $R_2$ in such a manner that the transistor is brought into the conductive state. After the insertion of the plug $P_1$ in the cine-camera body the diode $D_1$ illuminates until the transistor is brought into the conductive state. As soon as the transistor $Q_1$ is brought into the conductive state the diode $D_1$ stops illumination, while the motor $M_1$ starts to rotate in such a manner the determined operation is carried out by the driving power of the motor $M_1$. On the other hand as soon as the transistor $Q_1$ is brought into a conductive state, the condenser $C_1$ is discharged through the transistor $Q_1$ so that the potential at A gradually decreases until it lies below that at B when the UJT $Q_2$ is brought into a non-conductive state. As the result of this the condenser $C_2$ is discharged through the resistance $R_2$ and after a certain determined time namely a time determined by the time constant of the circuit consisting of the resistance $R_3$ and the capacity $C_2$ the transistor $Q_1$ is brought into the non-conductive state so that the motor $M_1$ stops rotating. As soon as the transistor $Q_1$ is brought into the non-conductive state, the condenser $C_1$ begins to be charged from the beginning and after a certain determined time as mentioned above the transistor $Q_1$ is brought into the conductive state in such a manner that the motor $M_1$ starts to rotate, which procedure is repeated. As mentioned above with the insertion of the plug $P_1$ into the jack $J_1$ the motor $M_1$ rotates for a certain determined time with the interval of also a certain determined time, whereby while the motor $M_1$ does not rotate the diode $D_1$ illuminates so as to indicate like the above mentioned embodiments that the motor $M_1$ is out of function and that the battery $E_1$ circuit as a whole are in normal function, while the diode $D_1$ which does not illuminate indicates that the $M_1$ is running. Hereby the same effect as mentioned above can be obtained when the above mentioned illumination diode $D_1$ is inserted in series in the output circuit of the timer circuit, namely connected with the collector of the transistor $Q_1$.

Figure 5:
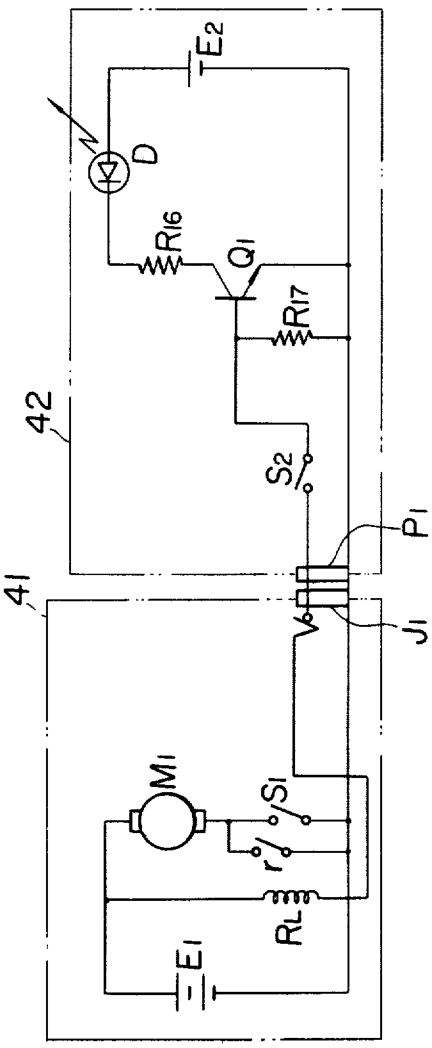

FIG. 5 shows a further embodiment of the present invention, whereby in the remote control unit the transistor $Q_1$ is applied in order to control the illumination of the diode.

In the Fig., 41 represents the cine-camera body as previously described with respect to FIG. 2 and 42 represents a remote control unit. In this unit 42, are provided a remote switch $S_2$, illumination diode D, a transistor $Q_1$ which controls the "on-off" of the illumination diode D, a resistance for limiting electric current connected to the collector of the transistor $Q_1$, a d. c. current source $E_2$, and a resistance $R_{16}$ connected between the base and the emitter electrodes of the transistor $Q_1$. The operation of the unit shown in FIG. 5 will now be described. When there is no break in the electric connections and the voltage of electric source $E_1$ is higher than the normal value, and if plug $P_1$ of the remote control unit 42 is connected to the jack $J_1$ of the cine-camera body 41, a closed circuit $E_1$—$R_L$—$J_1$—$P_1$—$S_2$—$R_{17}$—$E_1$ is formed and a voltage drop is produced in the resistance $R_{17}$. This turns the transistor $Q_1$ "on" and an electric current will flow in the illumination diode D, thus the illumination diode D will become illuminated. Since the contact *r* of the relay $R_L$ is closed by the flow of an exciting current in the relay $R_L$, an exciting current flows into the motor $M_1$, and the motor $M_1$ starts to operate. By the illumination of the illumination diode D, an indication is made that the electric current supply path of the motor $M_1$ has been positively closed, that there is no break in the circuit, and that the voltage of the electric source $E_1$ is normal.

Figure 6:
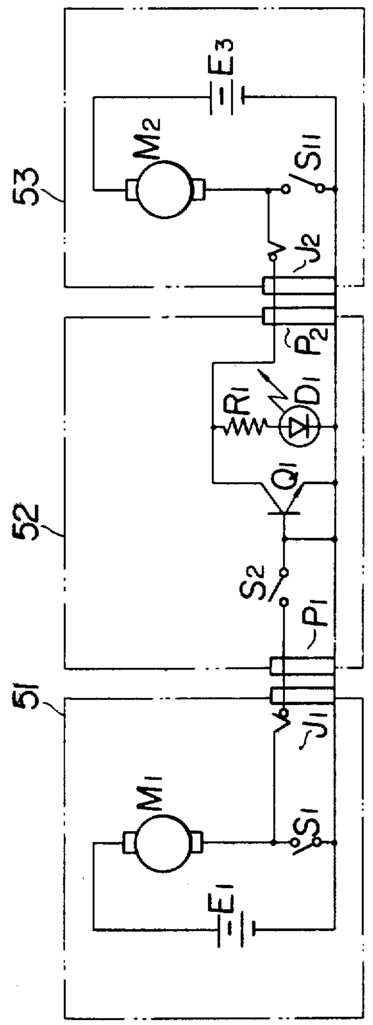

FIG. 6 shows a further embodiment of the present invention, whereby the remote control unit 52 controls two appliances 51 and 53 at the same time.

Figure 7:
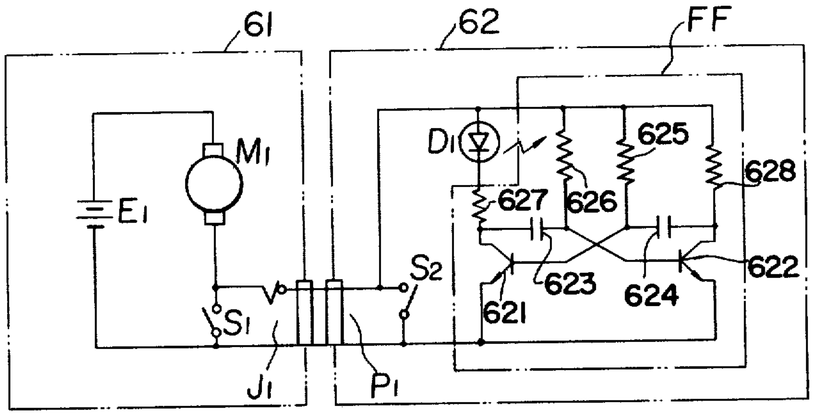

FIG. 7 shows a further embodiment of the present invention, whereby the illumination diode $D_1$ mentioned in the above mentioned embodiment is connected with the output circuit of the conventional astable multivibrator FF in such a manner that the diode $D_1$ does not illuminate while the motor $M_1$ is in function, while the diode $D_1$ repeats the illumination while the motor $M_1$ is out of function in such a manner that the operation state of the appliance 61 can better be recognized. In astable multivibrator FF, elements 621, 622 are transistors, 623 and 624 are capacitors and 625–628 are resistors.

Figure 8:
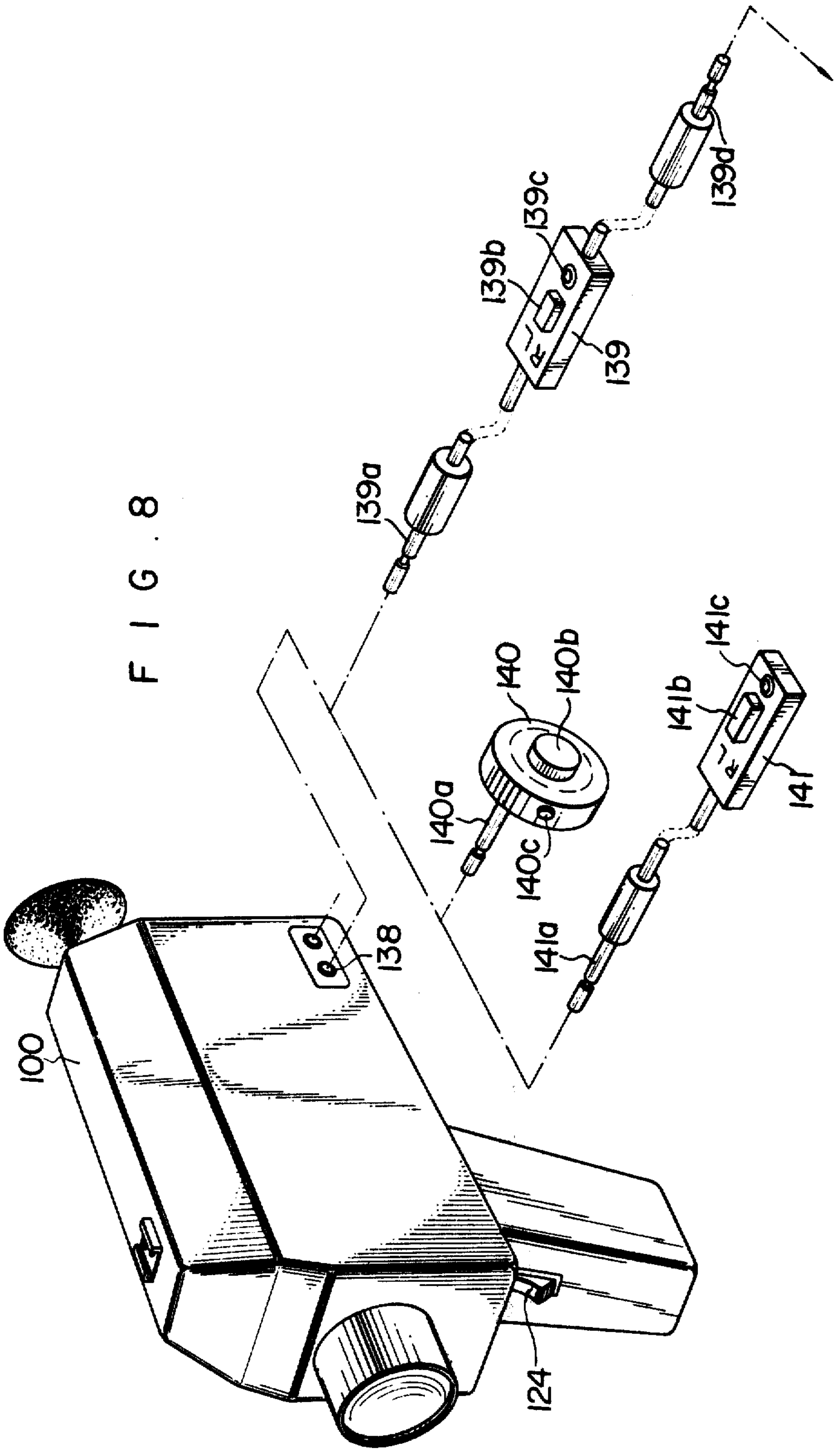
FIG. 8 shows an assembly of the remote control unit with the built-in circuits shown in FIGS. 1 – 7 as the remote control equipment of a cine-camera.

In FIG. 8 is shown a cine-camera and a remote control equipment in perspective view, whereby a remote control equipment with a built-in remote control unit having an above mentioned circuit arrangement is applied as remote control equipment for a cine-camera. In the cine-camera body 100, a shutter button 124 as the means to operate the release switch $S_1$ of the circuit in the above mentioned embodiment and a jack 138 as the connecting means with the remote control equipment are mounted. In this jack 138 can be inserted selectively the plug 139*a* of the remote control equipment 139 with the built-in remote control unit 52 shown in FIG. 6, that 140*a* of the timer equipment 140 with the built-in timer circuit 32 mentioned in FIG. 4 or that 141*a* of the remote control equipment 141 with the built-in remote control unit mentioned in FIGS. 1 – 3 as well as FIGS. 5 and 7. Hereby 139*b* is a switch in functional connection with the switch $S_2$ shown in FIG. 6, 139*c* the window for the illumination diode $D_1$ and 139*d* is the plug which can be inserted in a jack of other appliance (for example a tape-recorder hereby not shown) than the cine-camera 100. Further 140*b* is the button in functional connection with the switch $S_2$ shown in FIG. 4, 140*c* the window for the illumination diode $D_1$. Further 141*b* is the button in functional connection with the switch $S_2$ shown in FIGS. 1 – 3 as well as FIGS. 5 and 7, 141*c* the window for the illumination diode $D_1$.

As mentioned above according to the present invention by means of utilizing the illumination diode together with the remote control switch in the remote control unit or the self-timer circuit, the operation state of small electrical appliances such as cine-camera can be indicated while at the same time the state of battery as well as the damage in the circuit can also be checked, so that the present invention can be said very effective capable of expecting much effect from a remarkably simple circuit arrangement.

What is claimed is:

1. In a camera system having a camera and a detachable remote control unit, said camera including a driving motor, the improvement comprising:

a first pair of electrical connectors mounted on the body of the camera and connected in series with said motor;

a source of electrical energy mounted in said camera for driving said motor, said source being connected with said motor and at least one of said first pair of connectors, said energy source forming a drive circuit with said motor;

a second pair of electrical connectors associated with said remote control unit and detachably connectable with said first connectors;

light emitting indicating means associated with said remote control unit being responsive to current flow; and switching means associated with said remote control unit and connected to at least one of said second pair of connectors for actuating said motor drive circuit and for causing change of current flow through said indicating means for changing the condition of said indicating means.

2. The system of claim 1 also including a resistor associated with the remote control unit limiting the drive of said motor.

3. The system of claim 1 wherein said switching means is substantially in parallel with said indicating means so as to prevent current flow through said indicating means when closed.

4. The system of claim 1 wherein said switching means is in series with said indicating means for allowing current flow when closed.

5. The system of claim 1 wherein said indicating means is a light emitting diode.

6. The system of claim 1 wherein said remote control unit includes pulse generator means for supplying pulsed current to alternately cause the motor to rotate and said indicating means to emit light.

7. The system according to claim 1 including resistance means for adjusting the driving current of said motor so that an electric current flows into said motor which is lower than the driving current necessary to rotate said motor when said first and second connectors are connected.

8. The system of claim 6 wherein said pulse generator means is an astable multivabrator.

* * * * *